US009762940B2

(12) United States Patent
Meng

(10) Patent No.: US 9,762,940 B2
(45) Date of Patent: *Sep. 12, 2017

(54) METHOD AND ACCESS DEVICE FOR IMPLEMENTING IP BROADBAND VIDEO SERVICE

(71) Applicant: Huawei Technologies Co., Ltd., Shenzhen (CN)

(72) Inventor: Wanhong Meng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 39 days.

This patent is subject to a terminal disclaimer.

(21) Appl. No.: 14/849,522

(22) Filed: Sep. 9, 2015

(65) Prior Publication Data

US 2015/0382036 A1 Dec. 31, 2015

Related U.S. Application Data

(63) Continuation of application No. 13/866,339, filed on Apr. 19, 2013, now Pat. No. 9,179,172, which is a
(Continued)

(30) Foreign Application Priority Data

Mar. 22, 2005 (CN) .......................... 2005 1 0033804

(51) Int. Cl.
*H04N 21/2543* (2011.01)
*H04N 21/643* (2011.01)
(Continued)

(52) U.S. Cl.
CPC ..... *H04N 21/2543* (2013.01); *H04N 7/17327* (2013.01); *H04N 21/2541* (2013.01);
(Continued)

(58) Field of Classification Search
CPC ........... H04N 21/2541; H04N 21/2543; H04N 21/44204; H04N 21/64307; H04N 21/64322; H04N 7/17327
See application file for complete search history.

(56) References Cited

U.S. PATENT DOCUMENTS 5,517,494 A * 5/1996 Green ................... H04L 12/185
370/408
6,970,461 B2 11/2005 Unitt et al.
(Continued)

FOREIGN PATENT DOCUMENTS

CN 1395388 A 2/2003
CN 1404259 A 3/2003
(Continued)

OTHER PUBLICATIONS

1st Office Action in corresponding U.S. Appl. No. 11/859,301 (Mar. 3, 2010).
(Continued)

*Primary Examiner* — Rong Le
(74) *Attorney, Agent, or Firm* — Leydig, Voit & Mayer, Ltd.

(57) ABSTRACT

Embodiments of the present invention disclose a method and an access device for implementing an IP broadband video service, the method is executed by an access device, comprising: receiving by an access device located between a user terminal and a router, a request for demanding a program from the user terminal; determining by the access device that the user terminal has a watching or previewing right for the program; sending by the access device a multicast stream of the program to the user terminal; generating by the access device a billing record comprising the program on demand and information indicating a view duration of the program; and sending by the access device,
(Continued)

the billing recording to a video service support system for billing purpose.

9 Claims, 3 Drawing Sheets

Related U.S. Application Data continuation of application No. 11/859,301, filed on Sep. 21, 2007, now Pat. No. 8,533,750, which is a continuation of application No. PCT/CN2006/000309, filed on Mar. 2, 2006.

(51) Int. Cl.

| | | |
|---|---|---|
| *H04N 21/6405* | (2011.01) | |
| *H04N 21/254* | (2011.01) | |
| *H04N 21/442* | (2011.01) | |
| *H04N 7/173* | (2011.01) | |
| *H04N 21/482* | (2011.01) | |
| *H04N 21/658* | (2011.01) | |

(52) U.S. Cl.
CPC ... *H04N 21/44204* (2013.01); *H04N 21/4821* (2013.01); *H04N 21/6405* (2013.01); *H04N 21/64307* (2013.01); *H04N 21/64322* (2013.01); *H04N 21/6582* (2013.01)

(56) References Cited

U.S. PATENT DOCUMENTS

| | | | |
|---|---|---|---|
| 6,976,219 B2 | 12/2005 | Morita et al. | |
| 7,263,610 B2 | 8/2007 | Parker et al. | |
| 7,380,135 B2 | 5/2008 | Nishimoto et al. | |
| 7,430,754 B2 | 9/2008 | Speare et al. | |
| 7,552,457 B2 | 6/2009 | Van De Ven et al. | |
| 7,633,972 B1* | 12/2009 | Elliott | H04L 47/36 370/465 |
| 2002/0172368 A1* | 11/2002 | Peterka | H04N 7/165 380/278 |
| 2002/0174041 A1* | 11/2002 | Grey | G06Q 30/06 705/32 |
| 2002/0178446 A1 | 11/2002 | Sie et al. | |
| 2002/0186694 A1 | 12/2002 | Mahajan et al. | |
| 2003/0172165 A1* | 9/2003 | Xu | G06Q 30/0283 709/228 |
| 2003/0188318 A1 | 10/2003 | Liew et al. | |
| 2003/0224823 A1 | 12/2003 | Hurst et al. | |
| 2003/0233540 A1 | 12/2003 | Banerjee et al. | |
| 2004/0264443 A1 | 12/2004 | Beck et al. | |

FOREIGN PATENT DOCUMENTS

| | | |
|---|---|---|
| CN | 1540920 A | 10/2004 |
| CN | 1581817 A | 2/2005 |
| CN | 1595979 A | 3/2005 |
| CN | 1838766 B | 8/2010 |
| JP | 2003333580 A | 11/2003 |
| JP | 2004040560 A | 2/2004 |
| WO | WO 0245334 A1 | 6/2002 |
| WO | WO 2006099790 A1 | 9/2006 |

OTHER PUBLICATIONS

2nd Office Action in corresponding U.S. Appl. No. 11/859,301 (Aug. 23, 2010).
3rd Office Action in corresponding U.S. Appl. No. 11/859,301 (Jul. 12, 2011).
4th Office Action in corresponding U.S. Appl. No. 11/859,301 (Jan. 5, 2012).
1st Notice of Allowance in corresponding U.S. Appl. No. 11/859,301 (Jan. 18, 2013).
2nd Notice of Allowance in corresponding U.S. Appl. No. 11/859,301 (May 14, 2013).

* cited by examiner

METHOD AND ACCESS DEVICE FOR IMPLEMENTING IP BROADBAND VIDEO SERVICE

CROSS-REFERENCE TO RELATED APPLICATIONS

This application is a continuation of pending U.S. patent application Ser. No. 13/866,339, filed on Apr. 19, 2013. U.S. patent application Ser. No. 13/866,339 is a continuation of U.S. patent application Ser. No. 11/859,301, filed on Sep. 21, 2007, now U.S. Pat. No. 8,533,750. U.S. patent application Ser. No. 11/859,301 is a continuation of International Patent Application No. PCT/CN2006/000309, filed on Mar. 2, 2006, which claims priority to Chinese Patent Application 200510033804.2, filed on Mar. 22, 2005. The afore-mentioned patent applications are hereby incorporated by reference in their entireties.

FIELD OF THE TECHNOLOGY

The present invention relates to Internet Protocol (IP) broadband video technologies, and more particularly, to a method and an access device for implementing an IP broadband video service.

BACKGROUND OF THE INVENTION

Generally speaking, there are three modes for information transmission in an Ethernet including unicast, broadcast and multicast. The unicast mode is mainly used for the information transmission between two devices of a network, and the data encapsulation of the unicast mode is performed using IP address in any one of class A, B and C. The broadcast mode is used for the information transmission from one device to all the other devices in a network. During a broadcast, all digits in the part of host address in the destination IP address carried in the data packet are set as 1. The multicast mode is used for the information transmission from one device to multiple designated devices in a network, and the multicast data packet is encapsulated using IP address in class D.

The multicast technology has achieved a high effective point-to-multipoint data transmission in a network, which can effectively save network bandwidth and reduce network load, and thus the multicast technology is the optimum multipoint communication technology. The multicast technology has been widely used in multipoint communication service fields such as Web Television (TV), tele-education, real-time transmission of finance information, multimedia conference, game and emulation. A controllable multicast requires an access device to be served as a multicast service control point which is able to achieve a controllable access of video program, and may configure multicast right of each user, e.g., whether a user is allowed to receive a multicast program, which program a user is allowed to receive, program number that a user is allowed to receive simultaneously. The multicast right must be configured in a real time manner through a command line or a network management interface. FIG. 1 is a principle block diagram for performing controllable multicast video services in an IP Metropolitan Area Network (MAN). As shown in FIG. 1, after a user demands a video service, his right information will be generated by a video service support system/user management system and delivered to an access device. The access device guarantees that the configuration is instantly effective. The video service support system in FIG. 1 includes a head-end system, a user management, a program management, a right management, a playbill management and a charging management.

In the multicast technology, how to charge each user is a problem necessarily to be solved. There are two solutions for the problem in the prior art.

1. A first solution is a monthly fee mode.

In this solution, a terminal device of IP multicast such as a Set Top Box (STB) or a computer may join or quit a multicast group at any place in any time. The multicast router or multicast Layer 3 switch only needs to learn whether there is a terminal device of a physical sub-network belonging to a multicast group instead of saving the member relationship between terminal devices.

FIG. 2 is a principle diagram illustrating a system adopting monthly fee mode in the prior art. As shown in FIG. 2, when a user demands a program, an STB or a computer delivers a packet for joining a multicast group, and then an access device sends a request for joining the multicast group to an upper layer router or a program source of the Asynchronous Transfer Mode (ATM)/IP network. After joining the multicast group, the program source issues a video stream to the access device, and then the STB or computer will receive the video stream issued by the access device.

Since the access device is only able to learn whether a user is existed in a port, the access device is unable to learn how many users are existed in a port, not to mention to learn which user is online. It is impossible for the access device to learn when a specific user begins on line, when the user becomes off line, and which program the user has demanded. Moreover, it is impossible for the access device to generate an on-demand bill for a specific user. That is to say, in such a case, there is no record for a user demanding a program, and the charging of the access device may only use the monthly fee mode. The drawbacks of this solution are as follows.

(1) Lacking a valid user management mechanism: a user may join a multicast group and leave the group randomly. The multicast source is unable to learn when the user joins and quits. And there is a lack of a valid measure to control the transmission direction and range of the multicast information in the network.

(2) Lacking a valid charging measure: since the multicast protocol has no relationship with the charging, the multicast source is unable to learn when a user joins or quits and cannot calculate how many users are watching a multicast program within a time period, it is impossible to perform an exact charging.

(3) In the monthly fee mode, a user is able to demand programs randomly as long as he has paid the monthly fee, which seems to be very economical. In fact, only the users who are often on-line feel it is really economical. For the users who are seldom on-line, the monthly fee mode is uneconomical. Since a common user occupies little network resources in the aspect of network traffic and occupying time and is charged with no difference. The passion of such a common user will be affected, so that some potential users will flinch.

(4) The monthly fee mode may also lead to another psychology, i.e. some users consider "nonuse is uneconomical" because the monthly fee has been paid, so that they may watch many programs, even some programs they don't like, which leads to the waste of network resources and the network congestion, the impact the monthly fee mode is severer especially in the on-line rush hour phase, thereby restricting the profit and scale development of merchant finally.

(5) The simple monthly fee mode is a very non-flexible charging mechanism, which will lose many users. With the simple charging mechanism, the profits achieved by the network operator are very small while more resources and profits are lost.

2. A second solution is charging based on demanding times.

In this solution, the STB/computer performs interaction with a video server (video source) through a web page. The video server issues an Electronic Program Guide (EPG) to the STB/computer, a user selects the program he wants to watch using a remote control. The charging system performs the charging based on the time the user demands a program.

In this solution, the charging is performed based on times for clicking a program. It is impossible to learn the on-demand duration. Since it is impossible to perform the charging based on the on-demand duration, the charging thereof is very unreasonable. Moreover, under the circumstances that network resources are very scarce, if a user is frequently off line, it is necessary for the user to click multiple times to watch one program, thus it is unreasonable to perform the charging based on the demanding times. The single and non-flexible charging mode leads to negative influence for the development of service.

As can be seen from the existing solutions, the existing monthly fee mode and the demanding times based charging mode lead to negative influence for the development of service, because there are a lack of a valid user management mechanism and charging modes of the monthly fee mode and the demanding times based charging mode are single.

SUMMARY OF THE INVENTION

Embodiments of the present invention provide a method for implementing an Internet Protocol (IP) broadband video service, applicable to a charging system at least including a user terminal, an access device and a video server support system, the method including:

receiving, by an access device located between a user terminal and a router, a request for demanding a program from the user terminal, determining, by the access device, that the user terminal has a watching or previewing right for the program, sending, by the access device, the multicast stream of the program to the user terminal, generating, by the access device, a billing record comprising the program on demand and information indicating a view duration of the program; and sending, by the access device, the billing record to a video service support system for billing purpose.

An access device located between a user terminal and a multicast router, comprising:

a receiver configured to receive a request for demanding a program from a user terminal;

a processor coupled to the receiver and configured to determine that the user terminal has a watching or preview right for the program; and a transmitter coupled to the processor and configured to send a multicast stream of the program to the user terminal, wherein the processor is further configured to generate a billing record comprising the program on demand and information indicating a view duration of the program, the transmitter is further configured to send the billing record to a video service support system for billing purpose.

With the above solutions disclosed by embodiments of the present invention, the access device may generate and report the original bill to the video service support system. The original bill may include the information such as the program demanded by the user, joining time point and leaving time point. After receiving the original bill from the access device, the video service support system processes the original bill with the program on demand, charging rate and user parameters to obtain a real-time bill and save the real-time bill in the database, so as to provide a valid user management mechanism for the charging. The advantages of the method provided by embodiments of the present invention are as follows. (1) Performing a charging based on the user on-demand duration. (2) Performing a charging based on a specific user. The demanding right of users are different, and the charging thereof are also different. (3) Performing a charging based on a specific program. The charging standards are different for different programs. Besides, some programs may be charged while others are free. Furthermore, many functions such as audience rating may be achieved as well.

EMBODIMENTS OF THE INVENTION

In the embodiments of the present invention, start time point is recorded when a user starts demanding or previewing a program. Offline time point and the program on demand are recorded when the user is off line, so that a bill record is generated. A bill may be generated based on the bill record to charge the user.

Figure 1:
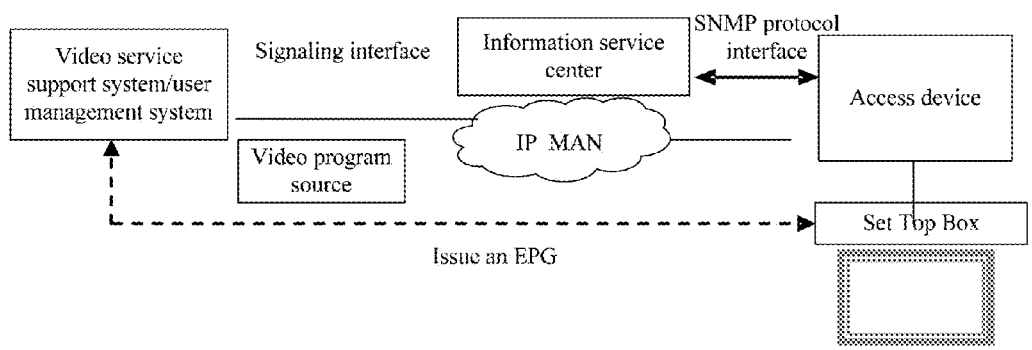
FIG. 1 is a principle diagram illustrating a system for performing controllable multicast video services in an IP MAN.
Figure 2:
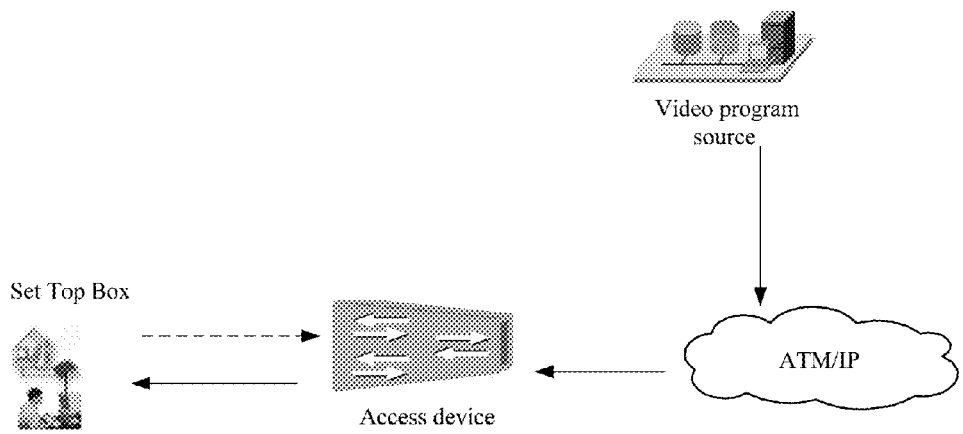
FIG. 2 is a principle diagram illustrating a system adopting monthly fee mode in the related art.
Figure 3:
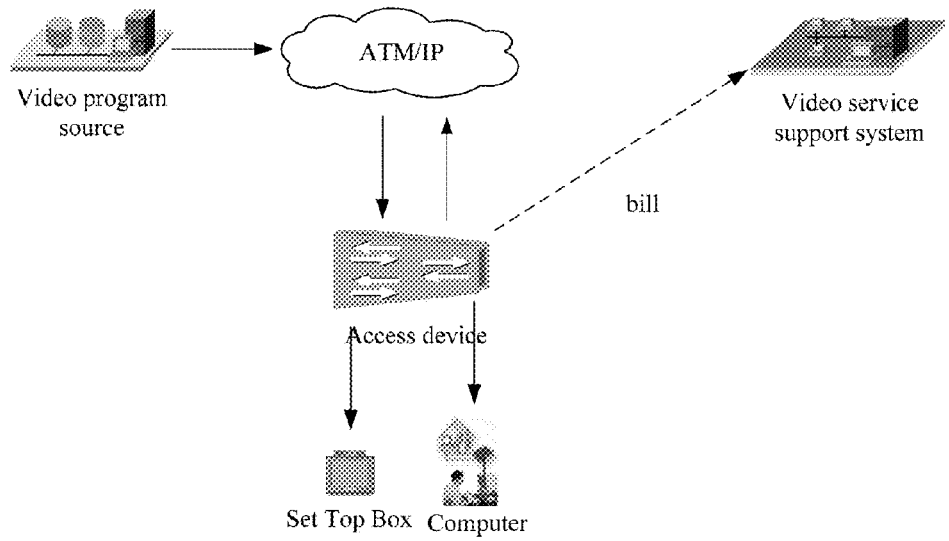
FIG. 3 is a principle diagram illustrating a system for performing a charging method in accordance with an embodiment of the present invention.
Figure 4:
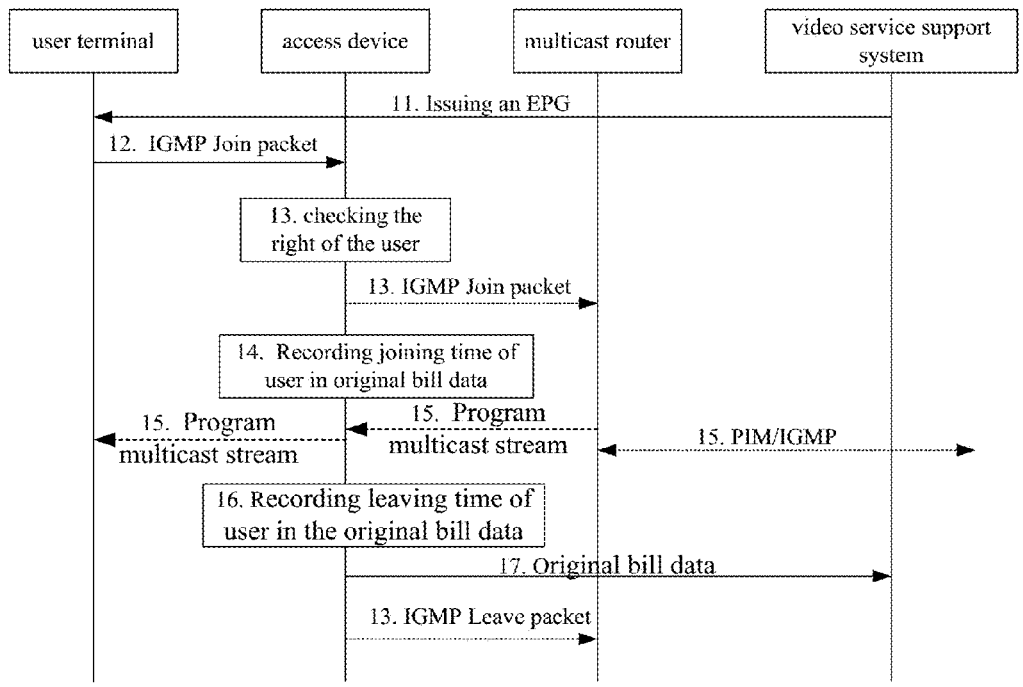
FIG. 4 is a service flowchart for performing a multicast charging in accordance with an embodiment of the present invention.

FIG. 3 is a principle diagram illustrating a system for performing a charging method in accordance with an embodiment of the present invention. As shown in FIG. 3, a bill is generated in the information interaction between an access device and a video service support system based on original bill as well as program on-demand fee bills preset in the existing video service support system, such as the program on demand, charging rate and user parameters. In an embodiment of the present invention, the service flow of multicast charging is shown in FIG. 4. FIG. 4 is a service flowchart for performing a multicast charging in accordance with an embodiment of the present invention. Each block of the flow is hereinafter described. It should be noted that, all blocks are not necessary to be performed in turn during practical execution.

Block 11: the video service support system issues a real-time generated EPG to a terminal device of each user, e.g., STB/computer, through the access device.

The EPG may be displayed on the screen of TV/computer in a real time manner. A user may use a remote control to demand a program based on the EPG. This block is common knowledge to those skilled in the art, which will not be further described herein.

Block 12: after a user, e.g., User A, demands a program, e.g., Program B, the STB of User A will generate an Internet Group Management Protocol Join (IGMP Join) packet, and send it to the access device.

The information carried in the IGMP Join packet includes the Media Access Control (MAC) address and IP address of the STB, the IP address of Program B requested to be watched, the multicast group joined by User A, etc.

For avoiding the exception caused by packet loss, the IGMP Join packet is generally sent two times.

Block 13: after receiving the IGMP Join packet sent by User A, the access device checks the right of User A. The detailed checking blocks will be hereinafter described with regards to FIG. 5. If User A has right to demand Program B, initiating a timer for User A and proceeding to block 14. Otherwise, terminating the procedure.

For example, in which User A has the on-demand right to receive multicast and to preview Program B instead of having right to watch Program B, if User A has not attained a preset intraday maximum preview time, the access device sets the on-demand state of User A as preview, adds 1 to the intraday preview times of User A, and initiates a previewing timer for User A. The on-demand state may be set through a state machine, which is well known to those skilled in the related art and not further described herein.

Moreover, served as an IGMP agent, the access device will check whether a member has joined the program group including Program B. If User A is the first member joining the program group, it is necessary for the access device to send the received IGMP Join packet to the upper layer multicast router of the ATM/IP network.

Block 14: the access device records the joining time point of User A. If User A is the first member joining the program group, proceed to Block 15. Otherwise, proceed to Block 16.

Block 15: if the access device has sent the received IGMP Join packet to the upper layer multicast router, the upper layer multicast router will send a multicast stream of Program B to the access device after receiving the IGMP Join packet from the access device. The access device will route the multicast stream of Program B to a port of User A after receiving the multicast stream.

The multicast router may need to exchange multicast routing information with an upper layer device by means of Protocol Independent Multicast (PIM)/IGMP protocol. It should be noted that, since there may be multiple routers between the program source and the users, the upper layer device mentioned above refers to the routers between the multicast router and the program source. If there are not other routers between the multicast router and the program source, the upper layer device mentioned above refers to the program source.

Block 16: when the timer of User A is overtime, the access device will delete the port of User A from the program group including Program B. The access device will cease forwarding the multicast stream of Program B to the port of User A, set the on-demand state of User A as offline, and record the leaving time point of User A.

Block 17: the access device sends to the video service support system the original bill including joining time point, leaving time point, on-demand state such as watching or previewing and program demanded by User A. The video service support system processes the received original bill with the program on-demand fee bills such as program, charging rate and user parameters, so as to obtain a real-time bill and save it in the database.

Block 18: when there is no user watching programs in the program group including Program B, the access device will send an IGMP Leave packet to the multicast router to request the multicast router not to forward the multicast stream of Program B any more. The information carried in the IGMP Leave packet includes the MAC address and IP address of the access device, and the IP address of the program to be deleted. The multicast router stops forwarding the data of Program B to the access device after receiving the IGMP Leave packet.

The previewing procedure has been described hereinabove. The watching procedure will be processed similarly to the previewing procedure. If User A has on-demand right to watch Program B, the access device will return to User A authorization information allowing User A to watch Program B, and record the joining time point and the on-demand state, i.e. watching, of User A. Then the access device will check whether Program B demanded by User A has been demanded by other users. If User A is the first user demanding Program B, the access device will send an IGMP Join packet to the upper layer multicast router. The upper layer multicast router will send the multicast stream of Program B to the access device after receiving the IGMP Join packet from the access device. The access device multicasts the received multicast stream to the port of User A. If other users have already demanded Program B, the access device will directly multicast the received multicast stream to the port of User A at the beginning.

When User A stops watching the program on demand, the access device will record the leaving time point of User A, and further check whether there are other users demanding the program. If there is no other user demanding the program, the access device will send an IGMP Leave packet to the multicast router. After receiving the IGMP Leave packet, the upper layer multicast router will stop sending the multicast stream of the program to the access device. And at the same time the access device stops sending the multicast stream to the port of User A. If there are still other users demanding the program, the access device will directly stop multicasting the received multicast stream to the port of User A.

At last, the access device sends the original bill of User A to the video service support system. The video service support system processes the original bill with the program on-demand fee bills such as program, charging rate and user parameters to obtain a real-time bill and save it in the database, so as to provide a valid user management mechanism for the charging.

Figure 5:
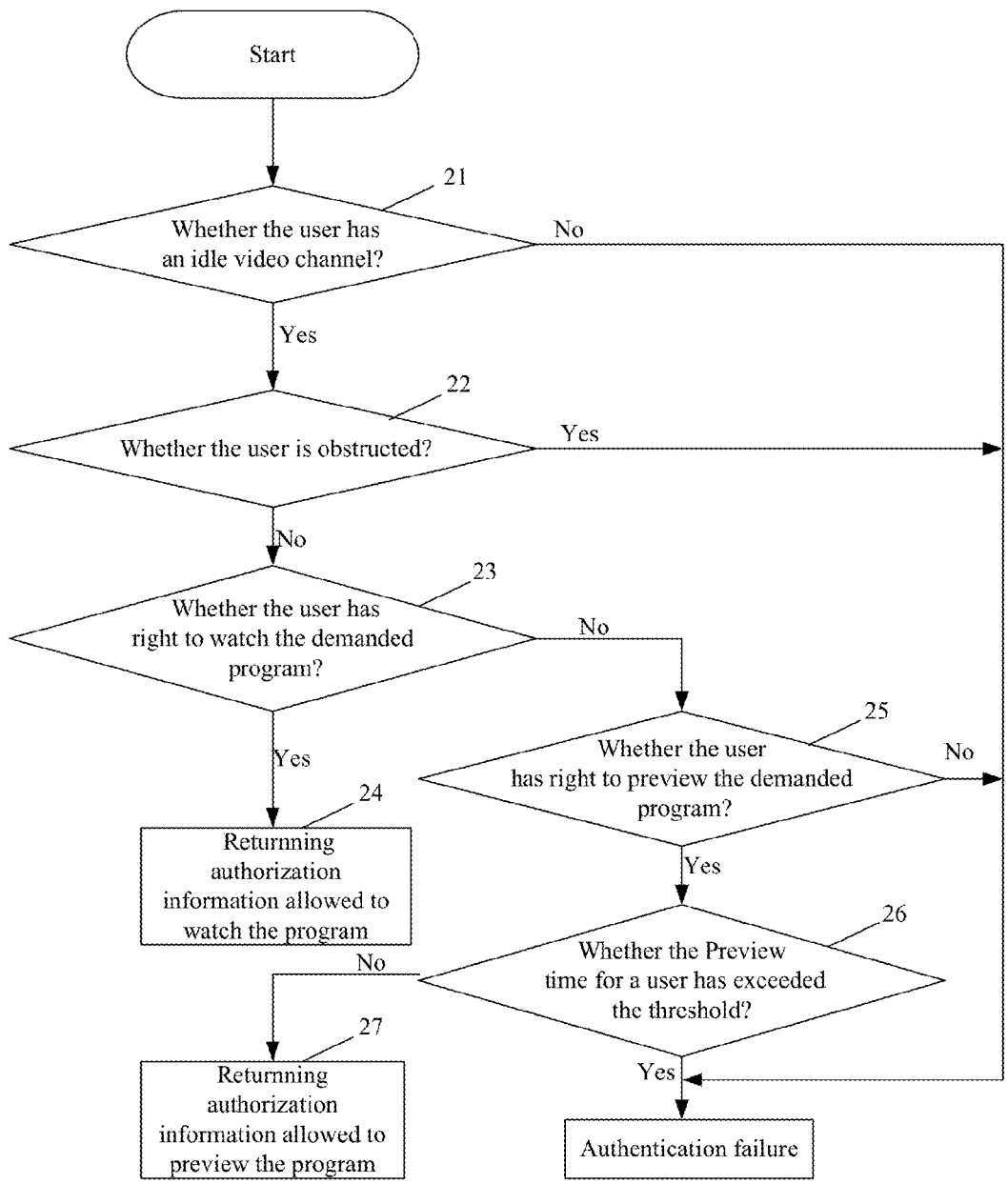
FIG. 5 is a flowchart for a user authentication in accordance with a preferred embodiment of the present invention.

In an embodiment of the present invention, the right of user is checked using the blocks shown in FIG. 5. FIG. 5 is a flowchart illustrating user authentication in accordance with an embodiment of the present invention. Each block of the flow will be hereinafter described respectively.

Block 21: the right of user regulates the maximum program number that can be watched by the user simultaneously, i.e. the maximum video channel number of a user. After receiving the authentication request from User A, the access device checks whether User A has an idle video channel to hold a new program. If User A has no idle video channel, the access device returns authentication failure information to User A, and terminates the procedure. Otherwise, proceed to block 22.

Block 22: the access device checks whether User A has been obstructed using record state in the preset user table for storing user registration information. If User A has been obstructed, which means the authentication is failed, the authentication result returned to User A is non-authentication, and the procedure is terminated. Otherwise, proceed to block 23.

The user table stores the user registration information, type of program that the user has right to demand, type of program that the user has no right to demand, program which the user not only has right to demand but also has right to watch, and program which the user has right to demand and preview instead of having right to watch.

The obstruction in the block refers to a user whose service has been stopped due to an unpaid bill.

Block 23: determine whether the user has right to watch the program on demand. If the user has right to watch the program on demand, proceed to block 24. Otherwise, proceed to block 25.

The access device searches a right template adopted by the user in the user table, and matches the user's right based on the right template of the user and the multicast IP of the program on demand. A user may bind one or more templates. The on-demand right of a user is watching or previewing some programs, which is determined by the bound templates of the user. If multiple templates are bound with a user, the user has all the on-demand right regulated by each template.

Block 24: if the user has right to watch the program on demand, the access device returns the authorization information indicating that the user is allowed to watch the program.

Block 25: if the user has no right to watch the program on demand, the access device further checks whether the user has right to preview the program on demand. Similar to the watching right, with regards to previewing, the right template also defines whether a specific user has right to preview each program. If the user has no right to preview the program, the access device returns the authentication failure information, and terminates the procedure.

Block 26: if the user has right to preview the program, a user parameter table defines the intraday maximum number allowed to preview programs for all the video channels of the user, so as to prevent the user from previewing programs exceeding the allowed number. If the number indicating how many programs the user has previewed in one day exceeds the maximum number, the access device will return the authentication failure information. The user on-demand state table records the number of programs that the user has already previewed. The recorded number may be reset by the timer at regular intervals, for example twenty-four hours.

Block 27: if the number indicating how many programs the user has previewed in one day does not exceed the maximum preview number, the access device returns the authentication information indicating that the user is allowed to preview the program.

During practical implementations, each program has its attributes including free or not, charging rate standard and applicable to which kinds of people. It is possible to construct a template applicable to a user based on different identification (ID)s, ages and favors of the user, and to bind the same template with the similar users. The generated bill may be sent to an information service center for saving and charging computation through a specific protocol. At the same time, it is possible to obtain other required statistic data such as audience rating of a specific program and on-demand rate of each time period based on such original data. The information service center herein may be included in the video service support system.

Different payment modes may be adopted after obtaining the bill of a user. (1) The payment modes may be divided into the following categories based on the payment time, e.g., pre-paid charging, post-payment, which may also support rechargeable charging mode. (2) The payment modes may be divided into following categorizes based on different discounts, e.g., time based discount, traffic based discount, time & traffic based discount. In the time based discount charging mode, the payment modes may be divided into per day based discount, per week based discount, per month based discount, per year based discount and discount in certain day. In the traffic based discount charging mode, different discounts may be provided based on different accumulated traffic. The time based discount and traffic based discount may be supported simultaneously. (3) Different charging rates may be provided based on different bandwidths. A user may select bandwidth of different grades when demanding a program. The charging system may provide different charging rates based on the bandwidth of different grades adopted by a user. Practically, the above charging modes may be flexibly combined based on user's requirements, so as to provide various charging package solutions for users.

If a user is charged based on the duration he/she watches the program on demand, the accumulated fee becomes higher as the duration becomes longer, which is independent of the traffic. The user may enjoy different discounts during different time periods, which are referred to as time period based discount. For example, the discount may be given on weekends, holiday and night. If the discount time periods are overlapped, e.g., at the night of holiday, the lowest discount may be given. Besides, a user may enjoy the accumulated discount while enjoying the time period based discount. The accumulated discount refers to that, during certain accumulated period, the discount will be lower along with the accumulated duration becomes longer, so as to encourage the consumption. If the time period based discount and the accumulated discount take effect simultaneously, the practical discount is the multiplication result of the two discounts. A user may also select a program bandwidth dynamically, and the programs with different bandwidths correspond to different charging rates.

If a user is charged based on traffic, the accumulated fee becomes higher as the used traffic becomes larger, which is independent of the duration. The traffic based charging mode is the mainstream of broadband service charging. A user may enjoy different discounts in different time periods, and at the same time may enjoy the accumulated discount. The accumulated discount herein refers to that, during certain accumulated period, the discount becomes lower as the accumulated traffic becomes larger. If the time based discount and the accumulated discount take effect simultaneously, the practical discount is the multiplication result of the two discounts. A user may also select a program bandwidth dynamically, and the programs with different bandwidths correspond to different charging rates.

With the above user bills, the charging may be performed based on actions of a user including watching and previewing, and the previewing may be free.

The audience rating statistics of various programs may be performed by using the above user bills. The audience rating statistic means to calculate how many users are watching a program at a specific time. When a user joins a program, adding one to the online user number of the program. When a user quits the program, subtract 1 from the online user number of the program. Such that the online user number of a program records the number of users watching the program in a real time manner. The video service support system may obtain the online user number of a program from a host periodically, and paint the audience rating curve of each program at each intraday time period.

By using the above user bills, it is possible to calculate the audience rating of each program based on the on-demand statistics of each program at each time period as well as to which people the program being applicable, so as to provide a more detailed bill to the operator and provide a basis for further decisions. It is possible to construct a personalized right template based on the audience rating, so as to provide a personalized audience right to users and attract more users.

By using the above user bills, it is possible to achieve the service value-added capability, so as to provide an effective value-added to the network and improve the income of network operation, which is helpful to the positive cycle of network operation and network scale, and provides a powerful guarantee for improving the competitive capability of network operator.

What the claims are:

1. A method comprising:
    receiving, by an access device located between a user terminal and a router, a request for demanding a program from the user terminal;
    determining, by the access device, that a user demanding the program has a watching or previewing right for the program;
    sending, by the access device, a multicast stream of the program to the user terminal;
    generating, by the access device, a billing record comprising information of the program on demand and information indicating a view duration of the program, wherein the view duration of the program comprises times of joining and leaving the program; and
    sending, by the access device, the billing record to a video service support system for billing purpose.

2. The method according to claim 1, further comprising:
    determining, by the access device, that the program on demand is not present at the access device;
    sending, by the access device, the request for demanding a program to the router;
    receiving, by the access device, the multicast stream of the program from the router.

3. The method according to claim 1, further comprising:
    recording, by the access device, the time of joining the program and the time of leaving the program.

4. An access device located between a user terminal and a router, comprising a processor and a non-transitory computer readable medium communicatively connected to the processor and having instructions stored thereon that, when executed by the processor, cause the access device to implement operations comprising:
    receiving a request for demanding a program from a user terminal;
    determining that a user demanding the program has a watching or preview right for the program;
    sending a multicast stream of the program to the user terminal;
    generating a billing record comprising information of the program on demand and information indicating a view duration of the program, wherein the view duration of the program comprises times of joining and leaving the program; and
    sending the billing record to a video service support system for billing purpose.

5. The access device according to claim 4, wherein the operations further comprising:
    determining that the program on demand is not present at the access device;
    sending the request for demanding a program to the router; and
    receiving the multicast stream of the program from the router.

6. The access device according to claim 4, the non-transitory computer readable medium stores the billing record.

7. A communication system for multicast service, comprising a router and an access device which is located between the router and a user terminal, wherein
    the router sends a multicast stream of a program to the access device,
    the access device comprises a processor and a non-transitory computer readable medium connected to the processor, and having stored thereon instructions that, when executed, cause the processor to:
    receive a request for demanding a program from the user terminal,
    determine that a user demanding the program has a watching or preview right for the program,
    send the multicast stream of the program to the user terminal,
    generate a billing record comprising information of the program on demand and information indicating a view duration of the program, wherein the view duration of the program comprises times of joining and leaving the program, and
    send the billing record to a video service support system for billing purpose.

8. The communication system according to claim 7, the access device is further configured to record the time of joining the program and the time of leaving the program.

9. The communication system according to claim 7, wherein the access device is further configured to:
    determine that the program on demand is not present at the access device;
    send the request for demanding the program to the router; and
    receive the multicast stream of the program from the router.

* * * * *